Nov. 1, 1949.  W. FADER  2,486,708
GRILL
Filed May 21, 1947
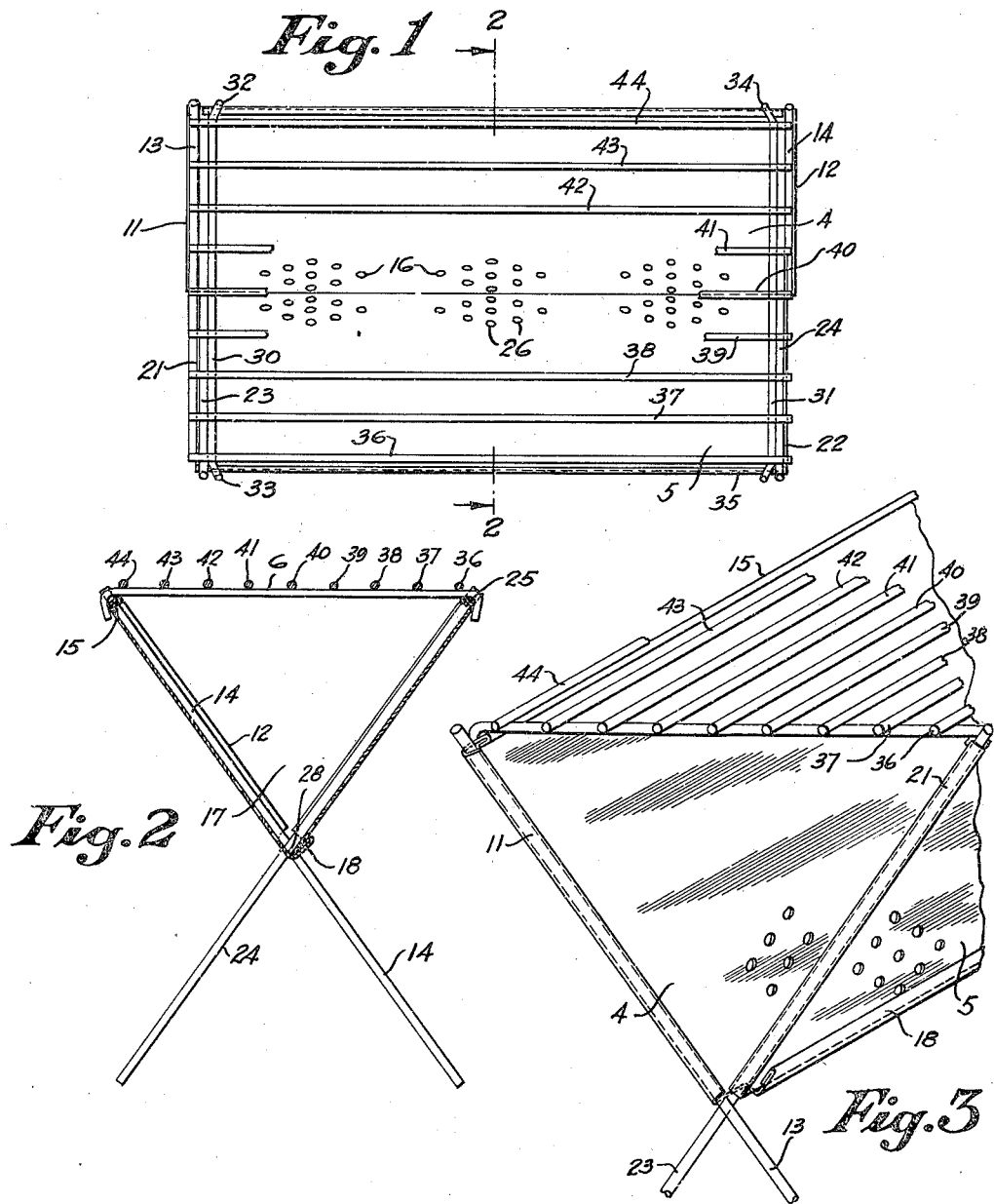
INVENTOR.
WILLIAM FADER
BY Richards & Geier
ATTORNEYS Patented Nov. 1, 1949

2,486,708

UNITED STATES PATENT OFFICE 2,486,708

GRILL

William Fader, Newark, N. J.

Application May 21, 1947, Serial No. 749,448

1 Claim. (Cl. 126—9)

This invention relates to grills and refers more particularly to a portable grill capable of use outdoors as well as indoors.

An object of the present invention is the provision of a portable grill which may be conveniently collapsed or folded during transportation and which can be quickly and easily set up for cooking purposes.

Another object of the present invention is the provision of a grill which is compact and light in weight and which can be effectively utilized for broiling or roasting a variety of foods.

Other objects of the present invention will become apparent in the course of the following specification.

The objects of the present invention may be realized through the provision of a grill comprising two plates which are adapted to interengage for the purpose of forming a receptacle for charcoal and the like; the plates are firmly connected with rods acting as legs or supports when the grill is set up. An upper support serving as a grill serves to hold the two plates in position and is used as a supporting surface for the food products during the broiling or roasting.

The invention will appear more clearly from the following detailed description when taken in connection with the accompanying drawing showing by way of example a preferred embodiment of the inventive idea.

In the drawing:

Figure 1 is a top view of the broiler when it is ready for use.

Figure 2 is a vertical section along the line 2—2 of Figure 1.

Figure 3 is a perspective partial view illustrating one end of the grill.

The grill shown in the drawing is composed essentially of three parts, namely, the two plates 4 and 5 and the grill support 6. These parts may be made of aluminum or any other suitable light metal or plastic.

The plate 4 has the shape of an elongated rectangle and is provided with upturned end flanges 11 and 12. Rods 13 and 14 are firmly connected to the flanges 11 and 12 respectively and extend beyond the plate 4 and constitute a pair of legs for the grill when the latter is set up.

The upper edge of the plate 4 has the form of a bent flange 15.

The lower portion of the plate 4 is provided with perforations or openings 16 which are used to provide sufficient draft for the coals which are placed in the space 17 between the plates 4 and 5.

The lower edge of the plates 4 has the form of an upturned flange 18 which is substantially larger than the flange 15 and which embraces the lower edge of the plate 5.

The plate 5 is somewhat similar in construction to the plate 4 and is provided with upturned side edges 21 and 22 corresponding to the edges 11 and 12 of the plate 4. Rods 23 and 24, which are equal in length to the rods 13 and 14, are firmly connected to the edges 21 and 22 respectively.

The upper edge of the plate 5 has a small flange 25. Another small inwardly bent flange 28 is provided upon the lower edge of the plate 5.

Perforations 26 of the plate 5 correspond in size and location to the perforations 16 of the plate 4.

It is apparent that the two plates 4 and 5 may be conveniently placed one next to the other during transportation. When the grill is set up for use, the rods 13 and 14 of the plate 4 are located on the outside of the grill while the rods 23 and 24 of the plate 5 will extend between the rods 13 and 14. Consequently, the edges 21 and 22 will be somewhat closer to each other than the edges 11 and 12 of the plate 4. The lower edge of the plate 5 with the inwardly turned flange 28 will be located within the bend or pocket formed by the larger flange 18 of the plate 4.

Due to this arrangement, the lower edges of the plates 4 and 5 are joined in a hinge-like manner and the two plates when set up as described, will not collapse but will remain in an upright position with the flange 18 supporting the plate 5.

The grill 6 includes two transverse parts 30 and 31. The bar 30 is provided with two downwardly extending hook-shaped projections 32 and 33 engaging the upper edges of the plates 4 and 5 respectively. The bar 31 is provided with similar hook-like projections 34 and 35 which also engage the upper edges of the plates 4 and 5 respectively. Due to this arrangement, the bars 30 and 31 of the grill 6 hold the plates 4 and 5 firmly in place when the grill is set up.

Rods 36 to 44 are firmly connected with the bars 30 and 31 and extend lengthwise of the grill. The number of these rods obviously may be varied at will.

It is apparent that during transportation the plates 4 and 5 of the grill 6 may be placed side by side to form a very small package.

In order to set up the grill, it is merely necessary to insert the flange 28 of the plate 5 within the flange 18 of the plate 4 and to cause the hooks 32 to 35 of the grill 6 to engage the upper edges of the plates 4 and 5. Charcoal may be introduced into the space 17 from the open sides of the grill and will combust effectively due to the provision of the openings 16 and 26 and its location above the ground.

Foodstuffs may be conveniently broiled and roasted by being placed upon the rods 36 to 44 of the grill 6.

It is apparent that the invention shown above has been described solely by way of illustration and not by way of limitation and that the example described above can be varied or modified within the scope of the present invention; all such variations and modifications are to be included within the scope of the present invention.

What is claimed is:

A grill, comprising two substantially rectangular plates, one of said plates having an upwardly bent means at its lower edge over a substantial portion of the length, said means being spaced from the sides of said plate, said plate being notched at the lower edge adjacent the sides and extending upwardly from the means, said plates having rods located at the side edges and firmly connected therewith, said rods extending beyond the lower edges of said plates to form the legs of the grill, said other plate having its lower edge resting on said means with its end rods passing through said notches, said means forming the sole pivotal connection between said plates, and an upper support comprising a grid member having hook-like ends overlapping said upper edges and engaging the same to prevent the spreading of said upper edges.

WILLIAM FADER.

REFERENCES CITED

The following references are of record in the file of this patent:

UNITED STATES PATENTS

| Number | Name | Date |
|---|---|---|
| 1,250,861 | Hackney | Dec. 18, 1917 |
| 2,003,974 | Pearson | June 4, 1935 |
| 2,053,577 | Pearson | Sept. 8, 1936 |
| 2,104,534 | Wolff | Jan. 4, 1938 |
| 2,152,168 | Anderson | Mar. 28, 1939 |
| 2,164,835 | Pearson | July 4, 1939 |

FOREIGN PATENTS

| Number | Country | Date |
|---|---|---|
| 385,459 | Great Britain | Dec. 29, 1932 |